Aug. 25, 1936. A. J. L. MORITZ ET AL Re. 20,079
MANUFACTURE OF ARTIFICIAL SILK AND BY-PRODUCT RECOVERY THEREFROM
Original Filed Dec. 26, 1934
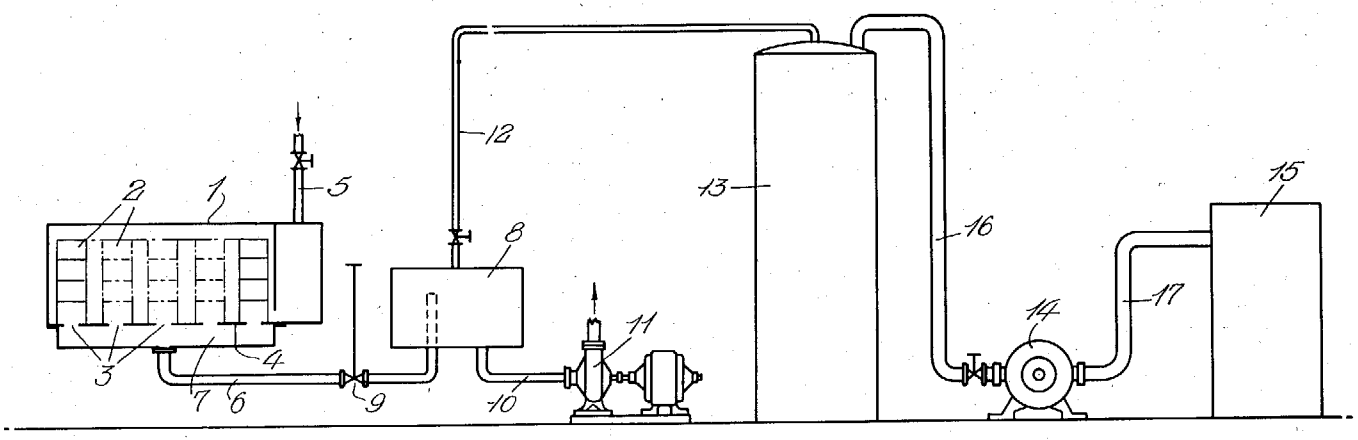
ADRIAN J. L. MORITZ and
JAN J. SCHILTHUIS.
INVENTORS,
BY Albin F. Knight
ATTORNEY Reissued Aug. 25, 1936 Re. 20,079

UNITED STATES PATENT OFFICE 20,079

MANUFACTURE OF ARTIFICIAL SILK AND BY-PRODUCT RECOVERY THEREFROM

Adrian J. L. Moritz and Jan J. Schilthuis, Enka, N. C., assignors to American Enka Corporation, Enka, N. C., a corporation of Delaware Original No. 2,042,016, dated May 26, 1936, Serial No. 759,272, December 26, 1934. Application for reissue June 18, 1936, Serial No. 86,022

5 Claims. (Cl. 18—54)

The present invention relates to the manufacture of artificial silk in such a manner that the by-products formed during the said manufacture are rendered recoverable, and are recovered by an improved process and apparatus therefor. More particularly, the invention is concerned with the recovery of carbon disulphide during the treatment of artificial silk after it has been extruded in the form of threads and collected in package form in a wet condition.

During the normal manufacture of viscose, cellulose is reacted with alkali to form the alkali cellulose. After aging the alkali cellulose to the desired extent, it is brought into contact with carbon disulphide to form by a combination reaction, alkali cellulose xanthate, and this said compound is then formed into what is termed the viscose solution by dissolving the same in a dilute alkaline solution. The spinning period of the viscose solution follows the preparation thereof, and this involves extruding and coagulating the solution to form threads therefrom. In this procedure the alkali cellulose xanthate is decomposed with the formation of cellulose, carbon disulphide, hydrogen sulphide and a small portion of free sulphur. A small part of the carbon disulphide and a large part of the hydrogen sulphide is carried away during the spinning operation intermixed with ventilated air at a point above the spinning machines. However, the largest proportion of the carbon disulphide is retained within the thus formed and collected artificial silk.

In the usual processes employed in the manufacturing of artificial silk, after the cellulosic solutions have been forced through the minute openings in the spinning nozzles to form threads or filaments and are coagulated by being passed through the acid spinning baths, the threads or filaments thus formed are wound on collecting devices such as bobbins, spools, cops, perforated carriers and the like; or as an alternative procedure the threads or filaments are spun into centrifugal spinning pots to form cakes. After such manipulations of the thread including the formation of the packages, it has been found necessary to extract impurities existing in the packages by washing, desulphurizing and drying the same in such a manner as to effect a uniform contraction of the thread throughout all parts thereof. To accomplish this in a practical manner, the packaged thread has been rewound from the bobbin or pot into skein form, and thereafter the thread in this form has been subjected to washing and desulphurizing by the drip wash method. The washing of the skeins of thread involved not only the removal of the impurities present therein, but also caused the removal of the by-products which were lost by being conducted away through the waste drain pipes provided for carrying off the treating solutions, or some of the more volatile by-products were passed off in the form of gases through exit pipes into the surrounding atmosphere.

The recovering of the carbon disulphide during the process of manufacture is of extreme importance and, so far as we are aware, this has not been heretofore accomplished. That the process including the recovery of carbon disulphide is of extreme importance will be readily appreciated when it is borne in mind that carbon disulphide is the principal reactant employed during the manufacture of viscose. This product is very expensive and owing to its extreme inflammability is difficult to handle particularly in transportation. Not only is the recovery practical from the standpoint of economy, but it is important to prevent the uncontrolled introduction of the carbon disulphide into the surrounding atmosphere with the resultant grave fire hazard. Then, too, this gas is also very obnoxious.

It is therefore an object of the present invention to provide a method of manufacturing artificial silk in which by-products formed during the manufacture of the artificial silk are rendered recoverable. Additionally, the invention contemplates the provision of a system in which the present method may be practiced.

Another object of this invention is the provision of an improved apparatus for the manufacture of artificial silk in which recoverable by-products formed during the manufacture are maintained confined at all times.

Still another object of this invention is the carrying out of a process by means of the said apparatus in which carbon disulphide, is subjected to such conditions as to effect its separation and recovery.

Other objects and advantages of the invention will be apparent from the following detailed description when considered in connection with the accompanying drawing, wherein:

The figure illustrates diagrammatically a system suitable for treating packages of artificial silk and the simultaneously separating and recovery of the by-products during such treatment.

In referring to the drawing in detail, the reference numeral 1 designates a vacuum wash tank for containing a plurality of artificial silk packages 2 positioned in any convenient manner such as by being placed in juxtaposition over perforations 3 located within the bottom 4 of the tank. A water supply pipe is shown at 5 for introducing water into the tank 1 and a suction pipe line 6 is located below and connected with the water and gas exhaust space 7 existing by virtue of the double bottomed construction of tank 1.

The suction pipe line 6 extends into a separator tank 8 and a valve means 9 is located within the pipe line 6 for shutting off the water and gas mixture at will. The separator tank 8 is provided with an exhaust water suction pipe 10 connected to a water pump 11 which is arranged for withdrawing the water containing waste materials and for exhausting the same through any suitable means.

Connected to the top of the separator tank is a pipe 12 which leads to a vacuum reserve tank 13. The vacuum tank is adapted to maintain a predetermined vacuum on the recovered by-products contained within the said tank. A main vacuum pump or pumps 14 is positioned at a suitable point between the vacuum reserve tank and an absorption apparatus 15, and this vacuum pump is connected by a piping arrangement 16 while the vacuum pump is connected on its other side with the absorption apparatus by a piping arrangement 17.

The above description of the recovery system explains the function of the various elements when employed in combination to carry out the present process.

In operation, it can be seen that the present process is especially adaptable to the vacuum washing system applied to packages of artificial silk. In such a system the packages whether in bobbin form or in cakes are transferred to the washing tanks immediately after they have been extruded in the form of filaments and wound or spun into packages. As was stated above, the vapors from the freshly wound packages contain a large proportion of carbon disulphide ranging from 15 to 40% by volume. These packages are placed within the wash tank over openings within the bottom of the tank and sealed. The tank is thereupon filled with water which is drawn through the packages from the outside to the inside as a result of the suction effect created by the vacuum within the cakes, and the carbon disulphide and water containing other impurities is drawn into a separator tank.

It is to be understood that if it is desirable, the washing liquid may be introduced into the space defining the interior of the packages and drawn to the exterior thereof by the same vacuum means. In fact, the manner in which the packages may be washed can be accomplished in a number of ways, just so the wash water and by-products are confined to the extent that they may be separated by subsequent practical operations.

As the entire system is under a vacuum, the carbon disulphide will not be dissolved by the water to any appreciable degree, and accordingly, substantially all of the carbon disulphide is withdrawn through the top of the separator tank while the water containing waste material may be pumped from the bottom of the said separator tank in any suitable manner.

The carbon disulphide containing a small amount of hydrogen sulphide and moisture is maintained at a practical working temperature and drawn by means of the vacuum pump into a reserve tank to be subsequently purified for reemployment in the manufacture of artificial silk. The purification of the carbon disulphide may be carried out in any one of a number of known operations.

It has been found very practical to purify and recover the carbon disulphide by means of absorbing the same through oils and subsequently steaming the carbon disulphide out of the oil. However, it might be desirable to recover and purify the carbon disulphide by means of charcoal or other solid absorbent materials or by absorbing the same in other types of solvents. Furthermore, recovery of carbon disulphide may be effected by partial condensation when the partial pressure of carbon disulphide in the mixture is sufficiently high.

Whereas the invention has been described as applicable to the system shown in the drawing, it is to be understood that the scope of the invention shall not be limited thereto in view of the fact that it is the intention to include all processes whereby carbon disulphide and other volatile by-products resulting from the manufacture and treatment of artificial silk are rendered recoverable by the said silk manufacture in which the said by-products are subsequently recovered in any practical manner.

We claim:

1. In the manufacture of artificial silk from viscose solutions wherein the solutions are extruded to form threads and the like and directly collected in package form, the process which comprises washing the freshly spun packages of artificial silk with an aqueous solution to eliminate the impurities and slightly soluble volatile by-products formed during the manufacture of the artificial silk, removing the thus charged solution to a separating zone, effecting the separation of the volatile by-products from the solution containing the other impurities, passing the separated volatile by-products into a reserve zone and finally purifying the by-products while at all times maintaining them confined, whereby substantially all of the by-products contained in the silk are recovered and adapted for reemployment in the manufacture of artificial silk.

2. In the manufacture of artificial silk from viscose solutions wherein the solutions are extruded to form threads and the like and directly collected in package form, the process which comprises washing the freshly spun packages of artificial silk with an aqueous solution to eliminate the impurities and $CS_2$ formed during the manufacture of the artificial silk, removing the thus charged solution to a separating zone, effecting the separation of the $CS_2$ from the solution containing the other impurities while under a pressure below atmospheric, passing the separated $CS_2$ into a reserve zone and finally purifying the $CS_2$ while at all times maintaining it confined, whereby substantially all of the $CS_2$ contained in the silk is recovered and adapted for reemployment in the manufacture of artificial silk.

3. In the manufacture of artificial silk from viscose solutions wherein the solutions are extruded to form threads and the like and directly collected in package form, the process which comprises washing the freshly spun packages of artificial silk with an aqueous solution by drawing the same through the packages from the exterior to the interior thereof by vacuum to take out the $CS_2$ formed during the manufacture of the artificial silk, removing the thus charged solution in toto to a separating zone, evacuating the space above the charged solution to thereby effect a separation of the $CS_2$ from the waste liquid, controlling the separating operation by passing the $CS_2$ into a reserve zone which permits the maintenance of a predetermined pressure below atmospheric to be imposed upon the system, and finally subjecting the confined $CS_2$ to the absorbent action of a suitable agent to purify the same, whereby substantially all of the $CS_2$ contained in the silk is recovered and adapted for reemployment in the manufacture of artificial silk.

4. In the manufacture of artificial silk from viscose solutions wherein the solutions are extruded to form threads and the like and directly collected in package form, the process which comprises washing the freshly spun packages of artificial silk with an aqueous solution to eliminate the impurities and slightly soluble volatile by-products formed during the manufacture of the artificial silk, removing the thus charged solution to a separating zone, effecting the separation of the volatile by-products from the solution containing the other impurities, and finally purifying the by-products while at all times maintaining them confined, whereby substantially all of the by-products contained in the silk are recovered and adapted for reemployment in the manufacture of artificial silk.

5. In the manufacture of artificial silk from viscose solutions wherein the solutions are extruded to form threads and the like and directly collected in package form, the process which comprises washing the freshly spun packages of artificial silk with an aqueous solution to eliminate the impurities and $CS_2$ formed during the manufacture of the artificial silk, removing the thus charged solution to a separating zone, effecting the separation of the $CS_2$ from the solution containing the other impurities while under a pressure below atmospheric and finally purifying the $CS_2$ while at all times maintaining it confined, whereby substantially all of the $CS_2$ contained in the silk is recovered and adapted for reemployment in the manufacture of artificial silk.

ADRIAN J. L. MORITZ.
JAN J. SCHILTHUIS.